United States Patent
Inoue et al.

(10) Patent No.: US 9,595,391 B2
(45) Date of Patent: Mar. 14, 2017

(54) CERAMIC ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Mitsunori Inoue, Nagaokakyo (JP); Naoko Nishimura, Nagaokakyo (JP); Tomohiko Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/804,403

(22) Filed: Jul. 21, 2015

(65) Prior Publication Data

US 2016/0027585 A1    Jan. 28, 2016

(30) Foreign Application Priority Data

Jul. 28, 2014 (JP) ................. 2014-153118

(51) Int. Cl.
*H01G 4/30* (2006.01)
*H01G 4/228* (2006.01)
*H01G 13/00* (2013.01)
*H01G 4/008* (2006.01)
*H01G 4/12* (2006.01)

(52) U.S. Cl.
CPC ............. *H01G 4/30* (2013.01); *H01G 4/0085* (2013.01); *H01G 4/1209* (2013.01); *H01G 13/006* (2013.01)

(58) Field of Classification Search
CPC ............ H01G 4/30; H01G 4/228; H01G 4/232
USPC ............................................ 361/301.4, 306.3
See application file for complete search history.

(56) References Cited

U.S. PATENT DOCUMENTS

| | | | | |
|---|---|---|---|---|
| 5,561,587 A | * | 10/1996 | Sanada | H01G 4/0085 361/306.1 |
| 6,373,683 B1 | * | 4/2002 | Higuchi | H01C 1/148 361/305 |
| 8,102,641 B2 | * | 1/2012 | Koga | H01G 4/228 29/25.42 |
| 9,384,898 B2 | | 7/2016 | Kang | |
| 2001/0035810 A1 | | 11/2001 | Heistand, II et al. | |
| 2009/0052114 A1 | * | 2/2009 | Motoki | H01G 4/30 361/306.3 |
| 2009/0128989 A1 | | 5/2009 | Suzuki et al. | |
| 2010/0067170 A1 | * | 3/2010 | Koga | H01G 4/228 361/306.3 |
| 2010/0302704 A1 | * | 12/2010 | Ogawa | H01G 4/30 361/306.3 |
| 2011/0193448 A1 | | 8/2011 | Saruban et al. | |
| 2013/0250480 A1 | | 9/2013 | Ahn et al. | |

(Continued)

FOREIGN PATENT DOCUMENTS

JP   H10261545 A   9/1998
JP   2004-500719 A   1/2004

(Continued)

*Primary Examiner* — Eric Thomas
(74) *Attorney, Agent, or Firm* — Arent Fox LLP (57) ABSTRACT

A ceramic electronic component that includes a ceramic element, and baked electrodes on a surface of the ceramic element. A resin film is formed at boundary sites between the ceramic element and the baked electrodes. The resin film includes a resin, and a cationic element that is a constituent element of the glass component in the baked electrodes.

18 Claims, 3 Drawing Sheets

(56) References Cited

U.S. PATENT DOCUMENTS

| 2016/0086733 A1* | 3/2016 | Saito | H01G 4/0085 |
| | | | 361/301.4 |
| 2016/0172110 A1* | 6/2016 | Otani | H01G 4/30 |
| | | | 361/301.4 |

FOREIGN PATENT DOCUMENTS

| JP | 2005-228904 A | 8/2005 |
| JP | 2010123865 A | 6/2010 |
| JP | 2014068000 A | 4/2014 |
| KR | 20090015146 A | 2/2009 |
| KR | 20110091449 A | 8/2011 |
| KR | 20130106568 A | 9/2013 |

* cited by examiner

CERAMIC ELECTRONIC COMPONENT AND MANUFACTURING METHOD THEREFOR

BACKGROUND OF THE INVENTION

1. Field of the Invention

The present invention relates to a ceramic electronic component and a method for manufacturing the component, and more particularly, to a ceramic electronic component such as, for example, a multilayer ceramic capacitor, a laminated coil, a thermistor, a varistor, and a multilayer substrate, which includes a ceramic element and a baked electrode provided on the ceramic element surface, and a method for manufacturing the component.

2. Description of the Related Art

It is common that baked electrodes of ceramic electronic components are formed by firing after applying a paste containing a metal filler, etc. to desired parts of ceramic element surfaces. In this case, in order to improve the adhesion between the baked electrodes and the ceramic elements, there are methods for adding a glass component to the paste as described in JP2005-228904 A and JP2004-500719 A. Furthermore, it is common that plated films obtained by plating are formed on the baked electrodes.

SUMMARY OF THE INVENTION

However, when baked electrodes containing a glass component are subjected to plating, the plating solution dissolves the glass component in the baked electrodes to affect the reliability and mechanical strength of the ceramic electronic component. For example, the glass component is easily dissolved in the plating solution, fluxes for mounting, or the like, and the dissolved sites thus become voids, thereby causing characteristic degradation (insulation degradation).

Therefore, an object of the present invention is to provide a ceramic electronic component which has favorable adhesion between a ceramic element and a baked electrode, and can eliminate defects caused by plating, and a method for manufacturing the component.

The present invention provides a ceramic electronic component that includes a ceramic element, a baked electrode provided on the ceramic element, and a resin film partially provided on the ceramic element and the baked electrode, wherein the resin film includes a resin and a cationic element among the constituent elements of a glass component of the baked electrode.

Among the constituent elements of the glass component of the baked electrode, the cationic element eluted from the baked electrode is deposited and contained in the resin film. Further, the constituent elements of the glass component include at least one of Si, B, P, Zn, Zr, Ti, Cu, Ca, K, Na, and Li. In addition, a plated film may be provided on the baked electrode.

In addition, in the ceramic electronic component according to an aspect of the present invention, the resin preferably has a thermal decomposition temperature of 240° C. or higher. Furthermore, the resin preferably includes at least one of an epoxy resin, a polyimide resin, a silicone resin, a polyamideimide resin, a polyetheretherketone resin, and a fluorine-containing resin. Thus, the ceramic electronic component has high heat resistance.

In addition, in the ceramic electronic component according to another aspect of the present invention, the resin film preferably contains resin components cross-linked by heating. Thus, the resin film can be formed in a short period of time.

Furthermore, the present invention also provides a method for manufacturing a ceramic electronic component including a ceramic element, a baked electrode provided on the surface of the ceramic element, and a resin film provided partially on the surface of the ceramic element and the surface of the baked electrode.

The method includes the steps of providing, to the surface of the ceramic element and the surface of the baked electrode, a resin-containing solution that has the function of etching a glass component of the baked electrode to ionize constituent elements of the glass component; and forming, partially on the surface of the ceramic element and the surface of the baked electrode, a resin film including a resin and a cationic element among the constituent elements of the glass component, which are ionized from the glass component and deposited.

Methods for providing the resin-containing solution to the surface of the ceramic element and the surface of the baked electrode include methods such as immersion and application. In addition, the resin means a resin that is adjusted to have a polar group such as a carboxyl group and an amino group, and able to be, as an organic substance or a composite of organic and inorganic substances, dissolved or dispersed in an aqueous solvent.

The resin-containing solution according to an aspect of the present invention contains a resin dispersed in an aqueous solvent, and has a component that etches (dissolves) the glass component, and a component that reacts ions derived from constituent element of the glass component with the resin component.

In another aspect of the present invention, the resin-containing solution etches (dissolves) the glass component of the baked electrode to ionize the constituent elements of the glass component. Then, the resin component dissolved (dispersed) in the resin-containing solution reacts with cationic elements among the ionized constituent elements of the glass component to neutralize the charge of the resin component. As a result, the resin component settles out along with cationic elements among the constituent elements of the glass component.

Specifically, the anionic resin component stably dispersed in the aqueous solvent reacts with the cationic elements among the constituent elements of the glass component to settle out through destabilization at the surface of the ceramic element and the surface of the baked electrode.

According to a further aspect of the present invention, the baked electrodes containing therein the glass component can improve adhesion between the ceramic element and the baked electrodes.

In addition, according to another aspect of the present invention, the resin film is formed on the surface of the ceramic element and the surface of the baked electrode, and the invention can thus improve reliability against ingress of plating solutions, and suppress strength degradation due to ingress of plating solutions. Defects associated with glass dissolution caused by plating can be thus eliminated, in particular, by forming the resin film at the boundary sites with segregated glass present at the surface of the ceramic electronic component.

The foregoing object, and other objects, features, and advantages of the invention will become more evident from the following description of embodiments, which will be provided with reference to the drawings.

DETAILED DESCRIPTION OF THE INVENTION

Embodiments of a ceramic electronic component and a manufacturing method therefor according to the present invention will be described.

1. Ceramic Electronic Component

A ceramic electronic component according to the present invention will be described with reference to a multilayer ceramic capacitor as an example.

Figure 1:
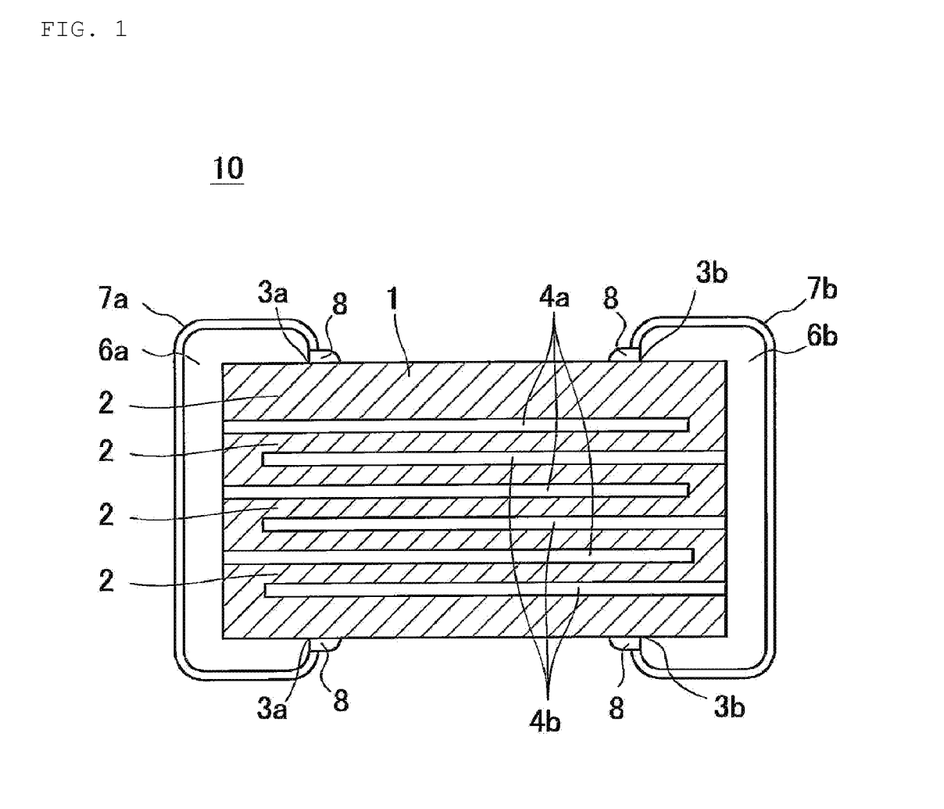
FIG. 1 is a cross-sectional view illustrating an embodiment of a ceramic electronic component according to the present invention.

FIG. 1 is a cross-sectional view illustrating a multilayer ceramic capacitor 10 that is a ceramic electronic component according to the present invention. The multilayer ceramic capacitor 10 includes a substantially cuboid ceramic element 1, and baked electrodes 6a and 6b formed on right and left ends of the ceramic element 1.

The ceramic element 1 is a laminated body obtained by stacking, in the thickness direction, a plurality of ceramic layers 2 and two or more pairs of internal electrodes 4a and 4b opposed to each other with the ceramic layers 2 interposed therebetween.

The ceramic layers 2 are composed of a ceramic material of $Pb(Mg,Nb)O_3$—$PbTiO_3$—$Pb(Cu,W)$—$ZnO$—$MnO_2$ as a main constituent mixed with $Li_2O$—$BaO$—$B_2O_3$—$SiO_2$ as an anti-reducing agent, or a ceramic material containing $CaZrO_3$—$CaTiO_3$ as its main constituent.

The internal electrodes 4a, for example, formed to have a substantially rectangular shape in planar view, have ends extended to the left end surface of the ceramic element 1, and electrically connected to the baked electrode 6a. The internal electrodes 4b, for example, formed to have a substantially rectangular shape in planar view, have ends extended to the right end surface of the ceramic element 1, and electrically connected to the baked electrode 6b. Thus, a capacitor function is achieved at sites with the internal electrodes 4a and 4b opposed. The internal electrodes 4a and 4b are composed of Ag, Cu, Ni, Pd, or an alloy of the metals, etc.

The baked electrodes 6a and 6b are baked electrodes each formed by applying, to the ceramic element 1, an external electrode paste, for example, including an AgPd alloy as a metal filler and a glass component containing Zn, and baking the paste. On the baked electrodes 6a and 6b, plated films 7a and 7b are respectively formed. The plated films 7a and 7b protect the baked electrodes 6a and 6b, and make solderability of the baked electrodes 6a and 6b favorable.

In this multilayer ceramic capacitor 10, glass frit is likely to be segregated, for example, at boundary sites 3a and 3b between the ceramic element 1 and the baked electrodes 6a and 6b. Therefore, a resin film 8 is formed at each of the boundary sites 3a and 3b between the ceramic element 1 and the baked electrodes 6a and 6b. The resin film 8 includes a resin, and cationic elements among the constituent elements of the glass component in the baked electrodes 6a and 6b.

The cationic elements among the constituent elements of the glass component in the baked electrodes 6a and 6b, which are contained in the resin film 8, are deposited by elution from the ceramic layers 2 of the ceramic element 1 and the baked electrodes 6a and 6b. More specifically, the cationic elements among the constituent elements of the glass component in the baked electrodes 6a and 6b include at least one of Si, B, P, Zn, Zr, Ti, Cu, Ca, K, Na, and Li which can be contained as the glass component in the baked electrodes 6a and 6b.

The resin included in the resin film 8 is a polyvinylidene chloride resin, an acrylic resin, an epoxy resin, a polyimide resin, a silicone resin, a polyamideimide resin, a polyetheretherketone resin, a fluorine-containing resin, or the like. The multilayer ceramic capacitor 10 typically undergoes a mounting step with soldering, and the resin film 8 thus preferably has high heat resistance (240° C. or higher). Accordingly, a resin is preferred which has a thermal decomposition temperature of 240° C. or higher. In this regard, there is a relationship of: (polyvinylidene chloride resin, acrylic resin)<epoxy resin<(polyimide resin, polyamideimide resin, polyetheretherketone resin, silicone resin, fluorine-containing resin) in terms of heat resistance.

Next, a ceramic electronic component according to the present invention will be described with reference to a laminated coil as an example other than multilayer ceramic capacitors.

Figure 4:
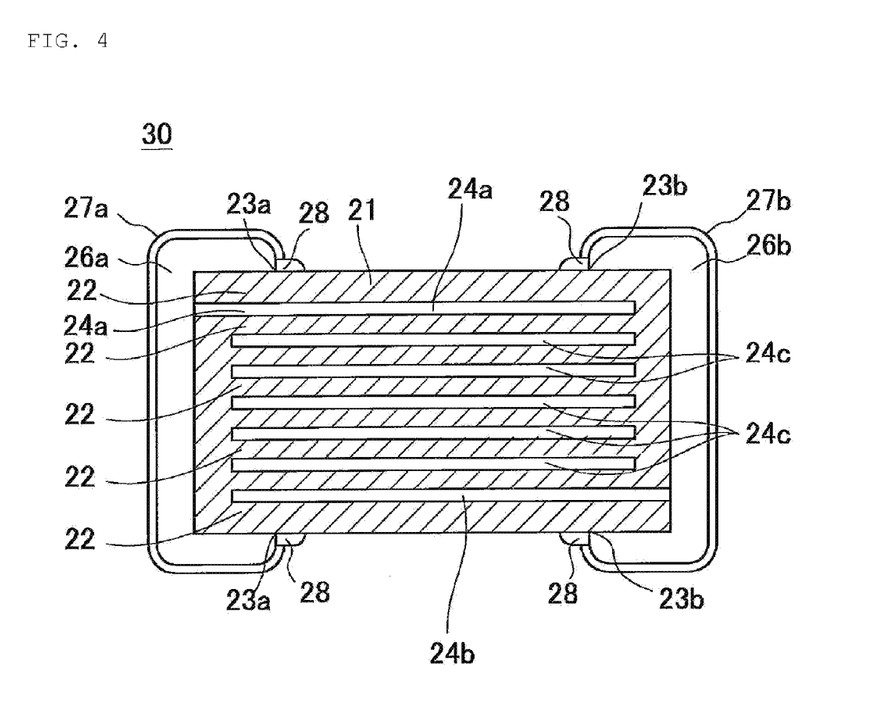
FIG. 4 is a cross-sectional view illustrating another embodiment of a ceramic electronic component according to the present invention.

FIG. 4 is a cross-sectional view illustrating a laminated coil 30 that is a ceramic electronic component according to the present invention.

The laminated coil 30 includes a substantially cuboid ceramic element 21, and baked electrodes 26a and 26b formed on right and left ends of the ceramic element 21.

The ceramic element 21 is a laminated body obtained by stacking a number of ceramic layers 22 and a number of internal electrodes 24a, 24b, and 24c in the thickness direction.

The ceramic layers 22 are composed of a magnetic ceramic material such as a Cu—Zn ferrite and a Ni—Zn ferrite.

The internal electrode 24a, for example, formed to have the shape of J in planar view, has an end extended to the left end surface of the ceramic element 21, and electrically connected to the baked electrode 26a. The internal electrode 24b, for example, formed to have the shape of J in planar view, has an end extended to the right end surface of the ceramic element 21, and electrically connected to the baked electrode 26b. The multiple internal electrodes 24c are each formed to have, for example, the shape of C in planar view between the respective ceramic layers 22 between the internal electrodes 24a and 24b. In addition, the internal electrode 24a, the multiple internal electrodes 24c, and the internal electrode 24b are connected in the form of a coil and in series, with respective through-hole electrodes that penetrate through the respective ceramic layers 22. Thus, a coil function is achieved between the baked electrodes 26a and 26b. The internal electrodes 24a, 24b, and 24c and the through-hole electrodes are composed of Ag, Cu, Ni, Pd, or an alloy of the metals, etc.

The baked electrodes 26a and 26b are baked electrodes each formed by applying, to the ceramic element 21, an external electrode paste, for example, including an AgPd alloy as a metal filler and a glass component containing Zn, and baking the paste. The baked electrodes 26a and 26b respectively have, on the surfaces thereof, plated films 27a and 27b formed. The plated films 27a and 27b protect the baked electrodes 26a and 26b, and make solderability of the baked electrodes 26a and 26b favorable.

In this laminated coil 30, glass frit is likely to be segregated, for example, at boundary sites 23a and 23b between the ceramic element 21 and the baked electrodes 26a and 26b. Therefore, a resin film 28 is formed at each of the boundary sites 23a and 23b between the ceramic element 21 and the baked electrodes 26a and 26b. The resin film 28 includes a resin, and cationic elements among the constituent elements of the glass component in the baked electrodes 26a and 26b.

The cationic elements among the constituent elements of the glass component in the baked electrodes 26a and 26b, which are contained in the resin film 28, are deposited by elution from the ceramic layers 22 of the ceramic element 21 and the baked electrodes 26a and 26b. More specifically, the cationic elements among the constituent elements of the glass component in the baked electrodes 26a and 26b include at least one of Si, B, P, Zn, Zr, Ti, Cu, Ca, K, Na, and Li which can be contained as the glass component in the baked electrodes 26a and 26b.

The resin included in the resin film 28 is, as in the case of the multilayer ceramic capacitor 10, a polyvinylidene chloride resin, an acrylic resin, an epoxy resin, a polyimide resin, a silicone resin, a polyamideimide resin a polyetheretherketone resin, a fluorine-containing resin, or the like.

The multilayer ceramic capacitor 10 thus configured has favorable adhesion between the ceramic element 1 and the baked electrodes 6a and 6b, because the glass component is contained in the ceramic element 1 and the baked electrodes 6a and 6b.

In addition, this multilayer ceramic capacitor 10 has the resin film 8 formed at boundary sites 3a and 3b between the ceramic element 1 and the baked electrodes 6a and 6b, and can thus improve reliability against ingress of plating solutions, and suppress strength degradation due to ingress of plating solutions. In particular, the resin film 8 is formed at the boundary sites 3a and 3b with segregated glass present at the surface of the multilayer ceramic capacitor 10, and defects associated with glass dissolution caused by plating can be thus eliminated.

The glass component in the ceramic electronic component is often present on and around the baked electrodes. Therefore, the boundary sites between the ceramic element and the baked electrodes have glass frit segregated, and serve as starting points for ingress of plating solutions or flux. Covering the boundary sites with the resin film can prevent chemical erosion, and contribute to reliability improvement.

In addition, the ceramic electronic component is often broken from the boundary sites between the ceramic element and the baked electrodes. This is because stress is concentrated on the sites. Therefore, covering the sites with the resin film can improve the strength.

In addition, the formation of the resin film over the entire surface of the ceramic element have the possibility of causing the resin film to be cracked or peeled, because of the increased area subjected to physical impacts in the case of plating. Therefore, when the resin film is not formed over the entire surface of the ceramic element, the resin film becomes less likely to be cracked or peeled.

Furthermore, the formation of the resin film around the baked electrodes on the ceramic element surface can form a so-called solder dam that prevents melted solder from flowing from the baked electrodes to the other parts.

In addition, because the glass component of the surface of the baked electrode is dissolved by the etching component contained in the resin-containing solution, the resin film will be formed on the surface of the dissolved baked electrode. The dissolution of the surface of the baked electrode increases the surface asperity, and improves adhesion to the resin film.

2. Method for Manufacturing Ceramic Electronic Component

Figure 2:
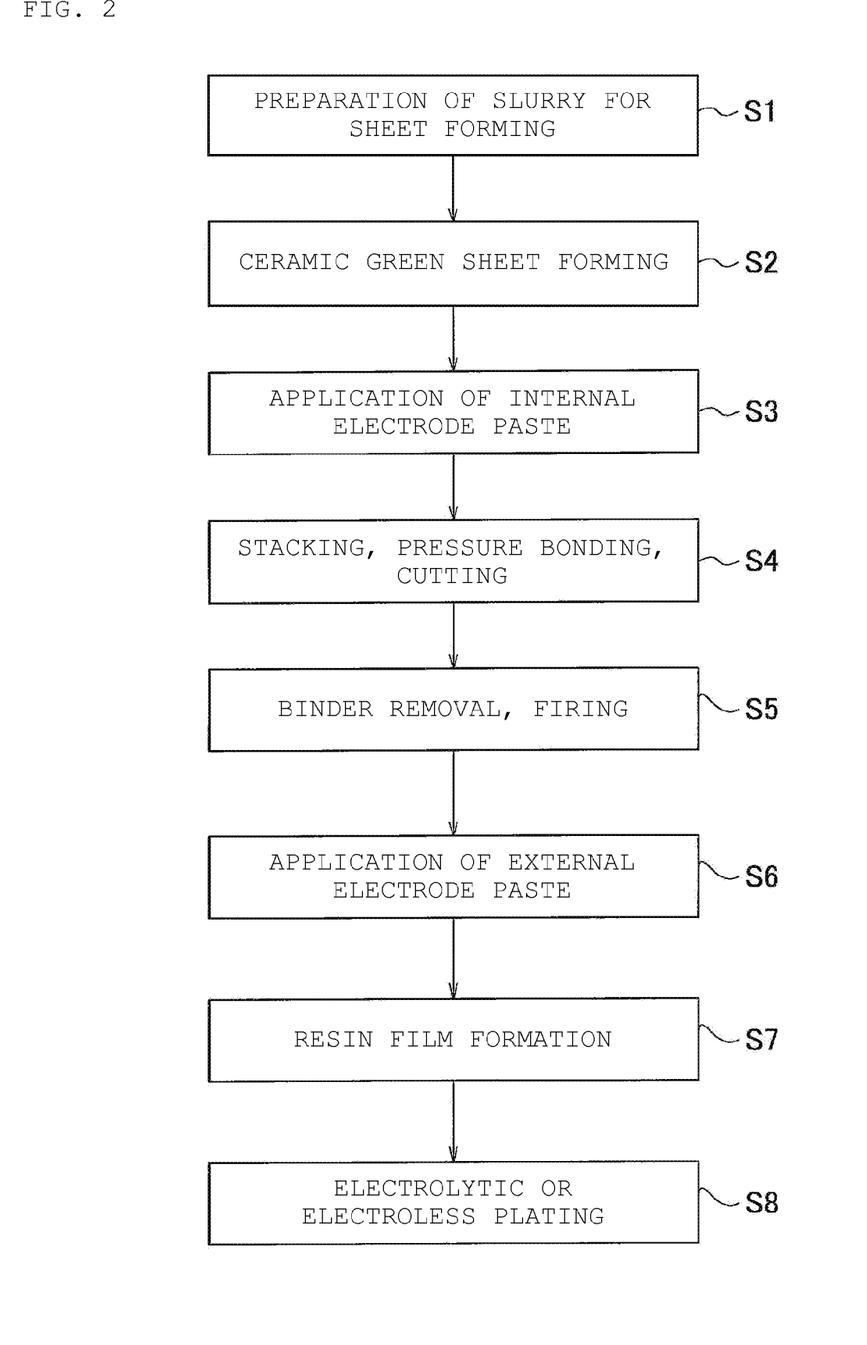
FIG. 2 is a flowchart showing an embodiment of a method for manufacturing the ceramic electronic component according to the present invention.

Next, a method for manufacturing the ceramic electronic component according to the present invention will be described with reference to the multilayer ceramic capacitor 10 as an example. FIG. 2 is a flowchart showing a method for manufacturing the multilayer ceramic capacitor 10.

In a step S1, slurry for sheet forming is prepared in such a way that an organic binder, a dispersant, and a plasticizer, etc. are added to a ceramic material of $Pb(Mg,Nb)O_3$—$PbTiO_3$—$Pb(Cu,W)$—$ZnO$—$MnO_2$ as a main constituent mixed with $Li_2O$—$BaO$—$B_2O_3$—$SiO_2$ as an anti-reducing agent, or a ceramic material containing $CaZrO_3$—$CaTiO_3$ as its main constituent.

Next, in a step S2, the slurry for sheet forming is formed into sheets by a doctor blade method to provide rectangular ceramic green sheets.

Next, in a step S3, an internal electrode paste containing Ag is applied onto the ceramic green sheets by a screen printing method to form electrode paste films to be formed into the internal electrodes 4a and 4b.

Next, in a step S4, the multiple ceramic green sheets with the electrode paste films formed are stacked so as to alternate directions in which ends of the electrode paste films are extended, and subjected to pressure bonding. This laminated ceramic green sheets are cut into a size for individual ceramic elements 1 to provide a plurality of unfired ceramic elements 1.

Next, in a step S5, the unfired ceramic elements 1 are subjected to binder removal treatment at 400° C. to 500° C. Thereafter, the unfired ceramic elements 1 are subjected to firing for 2 hours at a temperature of 900° C. to 1000° C. to provide sintered ceramic elements 1. The ceramic green sheets and the electrode paste films are subjected to co-firing, and the ceramic green sheets are formed into the ceramic layers 2, whereas the electrode paste films are formed into the internal electrodes 4a and 4b.

Then, in a step S6, an external electrode paste is applied to both ends of the sintered ceramic elements 1. Thereafter, on the sintered ceramic elements 1, the external electrode paste is baked at a temperature of 900° C. to form the baked electrodes 6a and 6b electrically connected respectively to the internal electrodes 4a and 4b.

Next, in a step S7, to the ceramic elements 1, a resin-containing solution is provided by an immersion method, or applied by spin coating. The resin-containing solution has the function of etching the glass component of the baked electrodes 6a and 6b to ionize the constituent elements of the glass component, and includes a resin component dissolved or dispersed in an aqueous solvent.

Furthermore, the resin-containing solution includes a neutralizer for dissolution or dispersion of the resin component, and if necessary, a surfactant for reaction with cationic elements among the dissolved constituent elements of the glass component. It is to be noted that after providing the resin-containing solution, the ceramic elements 1 are washed with a polar solvent such as pure water, if necessary.

In regard to the etching (dissolving) function of the resin-containing solution, the etching (dissolving) reaction can be developed just with the constituents of the resin-containing solution without adding any etching promoting constituent such as halogen, when the glass component contains therein Zn, Ca, K, Na, and Li. More specifically, the etching (dissolving) reaction proceeds when the pH of the resin-containing solution is set in a pH range (pH <6, pH >11) in which the Zn, Ca, K, Na, and Li contained in the glass component are present stably as ions.

Then, the resin component dissolved (dispersed) in the resin-containing solution reacts with cationic elements among the ionized constituent elements of the glass component to neutralize the charge of the resin component. As a result, the resin component settles out along with cationic elements among the constituent elements of the glass component, and partially deposits on the surface of the ceramic element and the surface of the baked electrode. Accordingly, in the deposited resin component, cationic elements are incorporated among the dissolved and ionized constituent elements of the glass component.

The glass component contains highly ionic elements of base metals such as alkali metals and alkaline-earth metals, and has high chemical solubility. Therefore, the glass component is also easily dissolved in plating solutions, while the film formation reaction with the resin-containing solution is also easily developed. While a surface layer of the glass is dissolved by the resin-containing solution, the influence is limited, and erosion by plating solutions is prevented by the barrier effect after the formation of the resin film. Thus, decreased reliability and decreased strength can be prevented.

The resin included in the resin-containing solution is a polyvinylidene chloride resin, an acrylic resin, an epoxy resin, a polyimide resin, a silicone resin, a polyamideimide resin, a polyetheretherketone resin, a fluorine-containing resin, or the like, but basically, it does not matter what kind as long as the resin is deposited by the present treatment.

In this way, the resin film 8 including cationic elements among the ionized and deposited constituent elements of the glass component and the resin is formed at the boundary sites 3a and 3b between the ceramic element 1 and the baked electrodes 6a and 6b. Thereafter, the resin film 8 is subjected to heating treatment. The heating treatment is intended to accelerate a cross-linking reaction between the resin components in the resin-containing solution deposited, and the heating condition varies depending on the type of the resin component. In general, the cross-linking reaction is likely to proceed under high temperature. However, the excessively increased temperature increases the decomposition reaction of the resin component. Accordingly, there is a need to set optimum temperature and time in accordance with the resin component.

Figure 3:
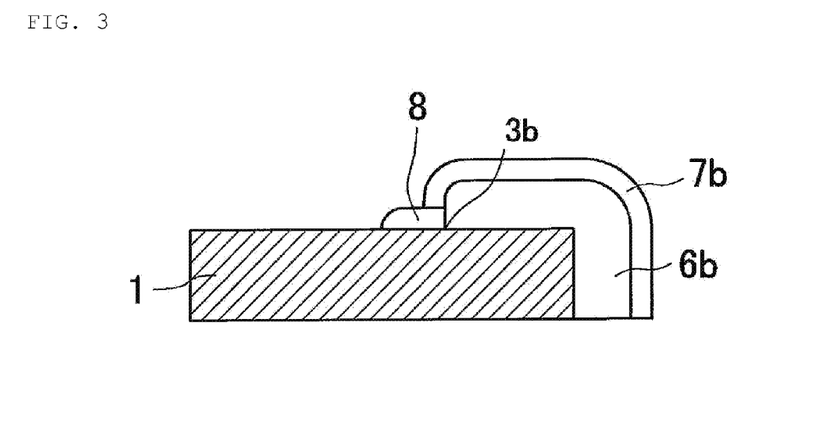
FIG. 3 is an enlarged cross-sectional view of a baked electrode.

Next, in a step S8, the plated films 7a and 7b are formed on the baked electrodes 6a and 6b by an electrolytic or electroless plating method. The plated films 7a and 7b adopt, for example, a double structure composed of a Ni plated film as a lower layer and an Sn plated film as an upper layer. FIG. 3 is an enlarged cross-sectional view of a site with the baked electrode 6b formed by the manufacturing method described above as shown in FIG. 2.

In this way, the resin film 8 can be partially formed at the boundary sites 3a and 3b between the ceramic element 1 and the baked electrodes 6a and 6b.

Examples

1. Examples and Comparative Example

Respective ceramic electronic components (multilayer ceramic capacitors, a laminated coil) according to examples and a comparative example were prepared, and subjected to characterization.

2. Multilayer Ceramic Capacitor (a) Examples 1 to 3

As shown in Table 1, the multilayer ceramic capacitor 10 (see FIG. 1) with the resin film 8 formed at the boundary sites 3a and 3b between the ceramic element 1 and the baked electrodes 6a and 6b was prepared by the manufacturing method described above as shown in FIG. 2. It is to be noted that the prepared multilayer ceramic capacitor 10 has no plated film 7a or 7b formed.

In this case, an external electrode paste including a glass component containing Zn was applied to the ceramic element 1, and baked to form the baked electrodes 6a and 6b.

In addition, as the resin-containing solution, a commercially available latex of a resin component dispersed in an aqueous solvent was used with an etching promoting constituent and a surfactant added thereto.

As the resin-containing solution according to Example 1, an acrylic resin (Trade Name: Nipol LX814A (from Zeon Corporation)) as the resin component was used through the adjustment of the pH to 5.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 2, a silicone resin (Trade Name: POLON-MF-56 (from Shin-Etsu Chemical Co., Ltd.)) as the resin component was used through the adjustment of the pH to 5.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 3, an epoxy resin (Trade Name: MODEPICS 302 (from Arakawa Chemical Industries, Ltd.)) as the resin component was used through the adjustment of the pH to 5.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

Then, the ceramic element 1 was immersed in the resin-containing solution for 5 minutes at room temperature, thereafter washed with pure water, and subjected to heat treatment at 150° C. for 30 minutes to provide the resin film 8 cured. It is to be noted that the soluble glass component was reacted by relatively lowering the concentration of the etching component contained in the resin-containing solution, or setting the pH to be relatively high.

(b) Comparative Example 1

As shown in Table 1, the multilayer ceramic capacitor 10 (Comparative Example 1) was prepared without any resin film formed.

3. Characterization of Multilayer Ceramic Capacitor

The prepared multilayer ceramic capacitors according to Examples 1 to 3 and Comparative Example 1 were evaluated for solubility in the following acid.

(a) Solubility in Acid

For each of the multilayer ceramic capacitors according to Examples 1 to 3 and Comparative Example 1, the amount of dissolution of the Zn constituent (the constituent unique to the glass) was investigated in the case of immersion in a 0.3% nitric acid solution for 30 minutes under the following condition. The average value for ten samples was regarded as the amount of dissolution.

Analysis Method: ICP-AES Analysis
External Dimensions of Sample: 1.6 mm×0.8 mm×0.8 mm
Number of Samples: 10
Solution for Dissolution: 5 ml of 0.3% Nitric Acid Solution
Immersion Condition: 30 minutes at room temperature Table 1 shows the results of the characterization of Examples 1 to 3 and Comparative Example 1.

TABLE 1

| | | Electronic Component | Resin Film | Resin-Containing Solution | pH | Immersion Time | Amount of Zn Dissolution |
|---|---|---|---|---|---|---|---|
| Example | 1 | Multilayer ceramic capacitor | Yes | Acrylic Resin + Sulfuric Acid + Surfactant | 5.0 | 5 minutes | 0.002 mg |
| | 2 | | | Silicone Resin + Sulfuric Acid + Surfactant | 5.0 | | 0.002 mg |
| | 3 | | | Epoxy Resin + Sulfuric Acid + Surfactant | 5.0 | | 0.002 mg |
| Comparative Example | 1 | Multilayer ceramic capacitor | No | — | — | — | 0.037 mg |

According to the results in Table 1, the amount of dissolution in the acid was large and 0.037 mg in the case of the untreated product (Comparative Example 1), but extremely small and 0.002 mg in the case of the compositions according to the present examples (Examples 1 to 3).

4. Preparation of Laminated Coil

In accordance with the same procedure as the manufacturing method described above as shown in FIG. 2, the laminated coil 30 (see FIG. 4) was prepared with the resin film 28 formed at the boundary sites 23a and 23b formed between the ceramic element 21 and the baked electrodes 26a and 26b. It is to be noted that the prepared laminated coil 30 has no plated film 27a or 27b formed.

In this case, an external electrode paste including a glass component containing Zn was applied to the ceramic element 21, and baked to form the baked electrodes 26a and 26b.

In addition, as the resin-containing solution, a commercially available latex of a resin component dispersed in an aqueous solvent was used with an etching promoting constituent and a surfactant added thereto.

As the resin-containing solution, an acrylic resin (Trade Name: Nipol LX814A (from Zeon Corporation)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

Then, at room temperature, the ceramic element 21 was immersed in the resin-containing solution, and the ceramic element 21 was subjected to energization with the baked electrodes 26a and 26b of the ceramic element 21 as cathodes. In this case, a voltage of +5 V was applied for 5 minutes with an electrode placed at an interval from the ceramic element 21 as an anode in the resin-containing solution. Thereafter, the ceramic element 21 was washed with pure water, and subjected to heat treatment at 150° C. for 30 minutes to provide the resin film 28 cured.

In regard to the laminated coil, it has been confirmed whether a resin film is formed or not at the boundary sites between the ceramic element and the baked electrodes under the following condition. In this case, with the boundary sites invisible between the ceramic element and the baked electrodes, it has been determined that a resin film is formed at the boundary sites between the ceramic element and the baked electrodes.

Equipment for Confirmation: SEM
External Dimensions of Sample: 1.6 mm×0.8 mm×0.8 mm
Number of Samples: 10

It has been successfully confirmed that a resin film is formed at the boundary sites between the ceramic element and the baked electrodes. This is for the following reason.

The application of a reduction current to the electrodes causes a phenomenon of partial current leakage, when the ceramic is low in resistance. When the reduction current flows through the ceramic, the state as an oxide is destabilized, and made more likely to be chemically etched. Then, the deposition achieved by chemical resist treatment is improved to make the resin film more likely to be formed, in particular, at sites near the electrodes.

In this way, the reaction can be accelerated by applying an electric field during the immersion in the resin-containing solution. The resin film can be selectively formed around the electrodes, because the reactivity is particularly high at the sites near the electrodes. This treatment is effective treatment in the case of being low in glass component and less reactive.

While cases where glass frit is likely to be segregated at the boundary sites between the ceramic element and the baked electrodes have been described as examples in the embodiments described above, the resin film may be formed at the sites at which glass frit is likely to be deposited, when glass frit is likely to be deposited at the other parts of the ceramic element and baked electrodes. In this way, reliability can be improved against ingress of plating solutions, and strength degradation due to ingress of plating solutions can be suppressed.

It is to be noted that the invention is not to be considered limited to the previously described embodiments, but can be modified variously within the scope of the invention.

The ceramic electronic component according to the invention is used in a preferred manner, in particular, as parts of electronic devices such as portable devices, for example.

What is claimed is:

1. A ceramic electronic component comprising:
   a ceramic element;
   a baked electrode on a surface of the ceramic element; and
   a resin film partially on the surface of the ceramic element and a surface of the baked electrode,
   wherein the resin film contains a resin and a cationic element that is a constituent element of a glass component of the baked electrode.

2. The ceramic electronic component according to claim 1, wherein the constituent element of the glass component comprises at least one of Si, B, P, Zn, Zr, Ti, Cu, Ca, K, Na, and Li.

3. The ceramic electronic component according to claim 1, wherein the resin has a thermal decomposition temperature of 240° C. or higher.

4. The ceramic electronic component according to claim 1, wherein the resin comprises at least one of an epoxy resin, a polyimide resin, a silicone resin, a polyamideimide resin, a polyetheretherketone resin, and a fluorine-containing resin.

5. The ceramic electronic component according to claim 1, wherein the resin film contains cross-linked resin components.

6. The ceramic electronic component according to claim 1, further comprising a plated film on the baked electrode.

7. The ceramic electronic component according to claim 1, wherein the ceramic electronic component is a multilayer ceramic capacitor.

8. The ceramic electronic component according to claim 1, wherein the ceramic electronic component is a laminated coil.

9. The ceramic electronic component according to claim 1, wherein the resin film is located at a boundary between the ceramic element and the baked electrode.

10. A method for manufacturing a ceramic electronic component, the method comprising:
    providing, to a surface of a ceramic element and a surface of a baked electrode, a resin-containing solution that etches a glass component of the baked electrode to ionize constituent elements of the glass component; and
    forming, partially on the surface of the ceramic element and the surface of the baked electrode, a resin film comprising a resin and a cationic element that is a constituent element of the glass component, the constituent element being ionized from the glass component and deposited.

11. The method for manufacturing a ceramic electronic component according to claim 10, wherein the method further comprises washing the ceramic electronic component after the resin-containing solution has been provided to the surface of the ceramic element and the surface of the baked electrode.

12. The method for manufacturing a ceramic electronic component according to claim 10, wherein the constituent element of the glass component comprises at least one of Si, B, P, Zn, Zr, Ti, Cu, Ca, K, Na, and Li.

13. The method for manufacturing a ceramic electronic component according to claim 10, wherein the etching is carried out when the resin-containing solution has a pH greater than 6 and less than 11.

14. The method for manufacturing a ceramic electronic component according to claim 10, wherein the method further comprises heating the resin until the resin contains cross-linked resin components.

15. The method for manufacturing a ceramic electronic component according to claim 10, wherein the resin comprises at least one of an epoxy resin, a polyimide resin, a silicone resin, a polyamideimide resin, a polyetheretherketone resin, and a fluorine-containing resin.

16. The method for manufacturing a ceramic electronic component according to claim 10, the method further comprising forming a plated film on the baked electrode.

17. The method for manufacturing a ceramic electronic component according to claim 10, wherein the ceramic electronic component is a multilayer ceramic capacitor.

18. The method for manufacturing a ceramic electronic component according to claim 10, wherein the ceramic electronic component is a laminated coil.

* * * * *